United States Patent [19]
Roy

[11] Patent Number: 5,079,864
[45] Date of Patent: Jan. 14, 1992

[54] BRUSH RAKE

[76] Inventor: James Roy, Rte. 2, Box 257, Spickard, Mo. 64679

[21] Appl. No.: 570,423

[22] Filed: Aug. 21, 1990

[51] Int. Cl.$^5$ .............................................. E02F 3/76
[52] U.S. Cl. ........................................ 37/2 P; 37/2 R
[58] Field of Search .................. 37/2 R, 2 P, 231, 271

[56] References Cited

U.S. PATENT DOCUMENTS

| | | | |
|---|---|---|---|
| 2,491,208 | 12/1949 | Price et al. | 37/2 R |
| 2,735,197 | 2/1956 | Struemph | 37/2 P |
| 2,860,426 | 11/1958 | Allin, Jr. et al. | 37/2 R |
| 2,932,100 | 2/1960 | Goethe | 37/2 P |
| 2,932,100 | 4/1960 | Goethe | 37/2 P |
| 3,021,619 | 2/1962 | McGee | 37/2 P |
| 3,034,237 | 5/1962 | Wolfe et al. | 37/117.5 |
| 3,090,138 | 5/1963 | Dudley | 37/2 P |
| 3,111,777 | 11/1963 | Prater | 37/2 P |
| 3,605,906 | 9/1971 | Coates | 37/231 X |
| 4,224,657 | 9/1980 | Olson | 37/120 |
| 4,364,191 | 12/1982 | Cazes | 37/2 R |
| 4,372,063 | 2/1983 | Work | 37/2 R |
| 4,407,080 | 10/1983 | Mann | 37/117.5 |
| 4,467,876 | 8/1984 | Gaule | 37/2 R X |
| 4,817,728 | 4/1989 | Schmid et al. | 37/271 X |
| 4,903,418 | 2/1990 | Loudon | "/2 R |

OTHER PUBLICATIONS

Bobcat Attachments Brochure; Melroe Co.; date unknown.
Bobcat Loader Brochure; Melroe Co.; date unknown.
Dymax Brochure; Dymax, Inc.; date unknown.
Uni-Loader Brochure; A. I. Case Co.; date unknown.

Primary Examiner—Dennis L. Taylor
Assistant Examiner—J. Russell McBee
Attorney, Agent, or Firm—Litman, McMahon & Brown

[57] ABSTRACT

A brush rake is provided for use in cooperation with a tractor-type vehicle and a tree shearing device. The rake includes a plurality of generally vertical and arcuate tines which are mounted on a backing plate to form a forwardly concave tine framework. The tine framework is quickly and releasably securable to the tractor. The backing plate includes upper and lower flanges which cooperate with an attachment mechanism on the tractor to engage and disengage the rake. The rake further includes a jack stand including at least one jack leg, a corresponding jack shoe, and a corresponding support member. The support member maintains the jack leg in a lowered position which maintains the rake in an upright position for ease of connection to the attachment mechanism. The support member is detachable so that the jack leg may be pivoted upwardly after attachment to the tractor.

10 Claims, 2 Drawing Sheets

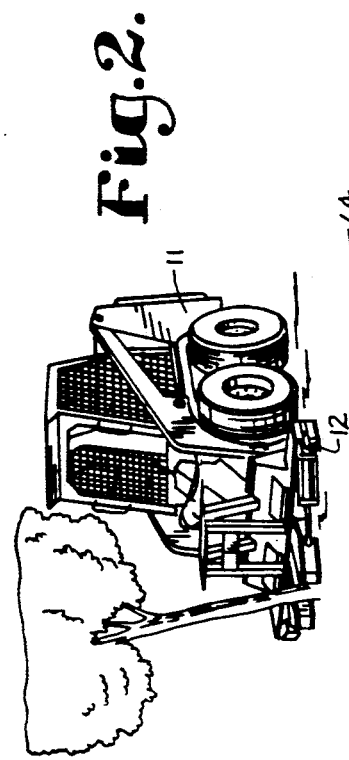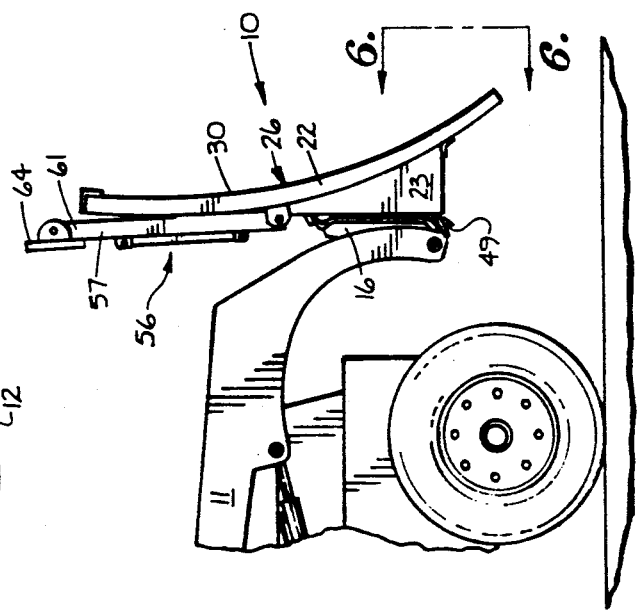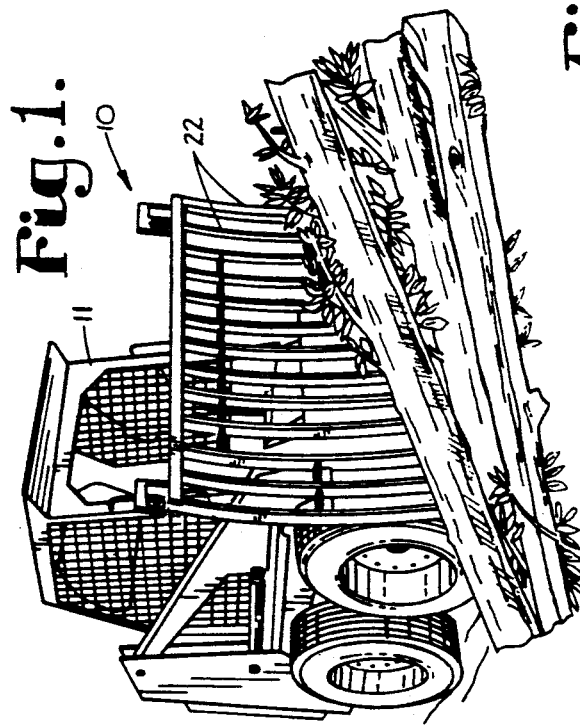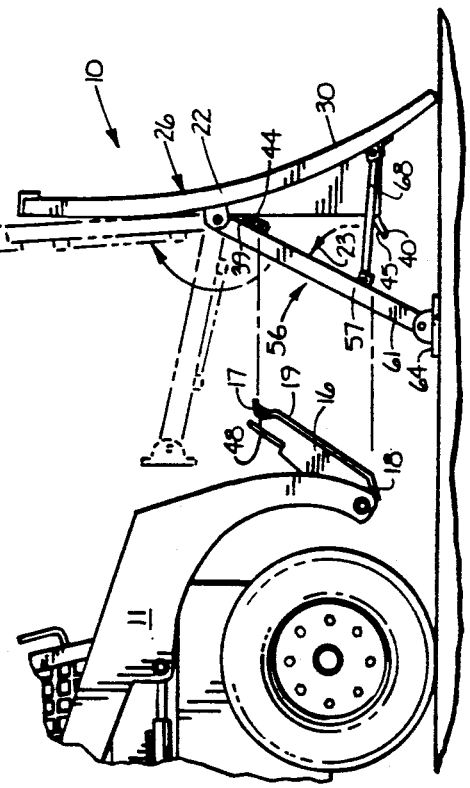

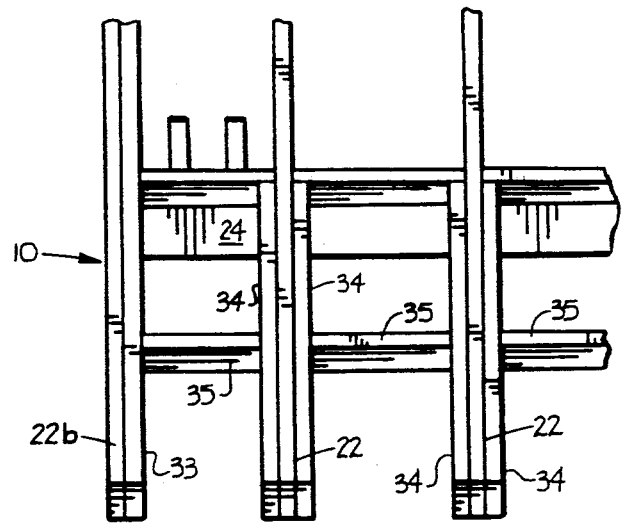
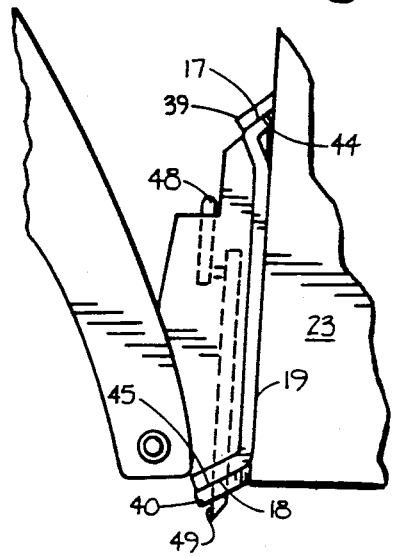
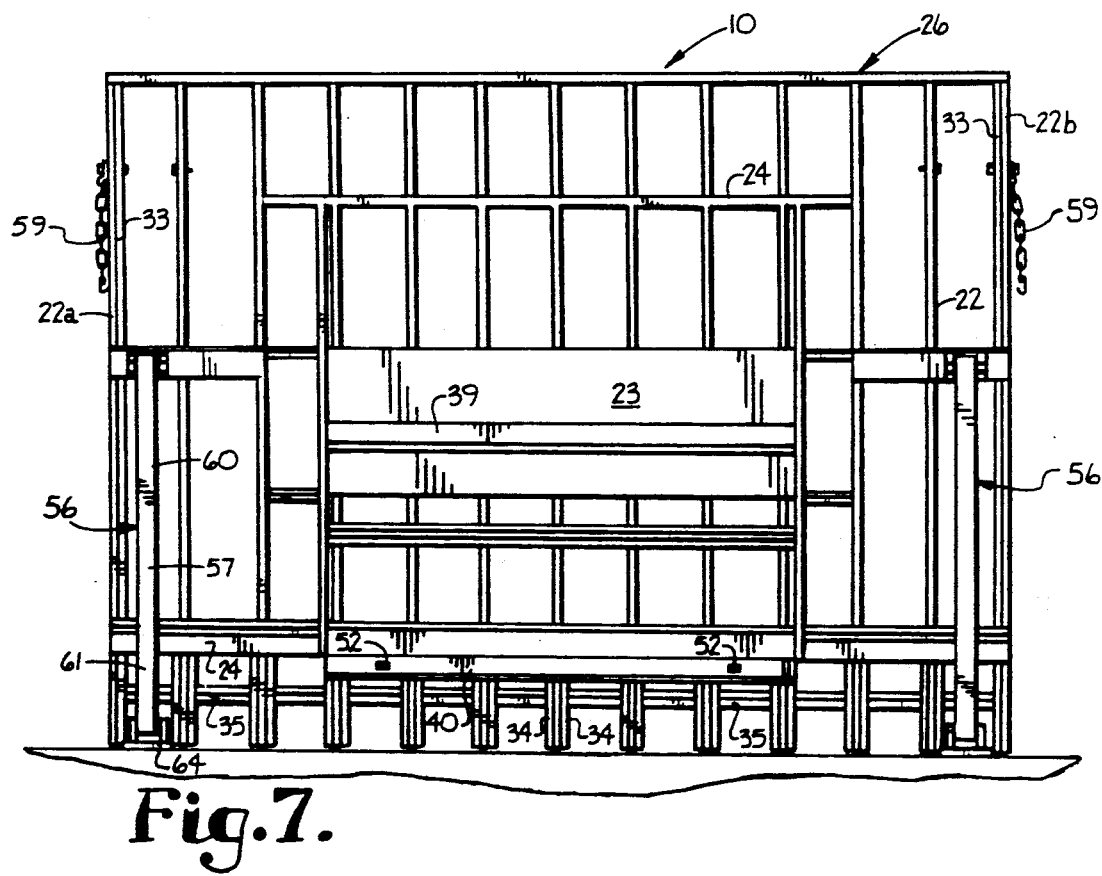

BRUSH RAKE

BACKGROUND OF THE INVENTION

The present invention relates generally to an attachment for a tractor type vehicle and more particularly to a brush rake attachment for skid steer-type loaders for use in combination with a tree shearing attachment.

In order to fully utilize land for many activities, brush and timber that cover such land must be cleared away. Present technology, however, performs unsatisfactorily in clearing land for certain applications. A common ground clearing operation utilizes a bulldozer to uproot trees and the like with its blade by pushing against any obstacle in the bulldozer's path and is referred to as bucking. Such an operation requires large, heavy machinery which is expensive and inefficient. In addition, bulldozers lack a high degree of maneuverability and often cannot be used to selectively clear certain areas while leaving desirable trees standing. Stressing or scarring of the desirable trees often results.

Also, by the nature of bucking, large amounts of dirt and soil are incorporated in the resulting brush pile. Bucking uproots trees by pushing them over, thus excavating the tree root balls as well as tearing up the top soil. The excess dirt and soil in the brush pile is disadvantageous because disposal by burning is incomplete and to prevent soil errosion, it is normally desirable to leave the top soil intact. Bucking is additionally disadvantageous because young, supple trees can bend underneath the blade and snap back as the bulldozer passes over so these trees must be removed by some other method.

Other devices have been used in clearing trees including attachments employed in conjunction with ground clearing systems such as ripping teeth that dig or rip the trees and brush from the soil. Ripping teeth, however, do not overcome the aforementioned disadvantages of bucking in that such an operation creates brush piles that include a substantial amount of soil.

Present technology is additionally insufficient in that many present attachments employ time-consuming and/or complicated connection procedures. Such systems are inefficient where bucking is not possible or desirable and one employs separate attachments to the tractor type vehicle for felling and for raking the timber and brush.

Additionally, present brush clearing attachments generally do not promote a rolling motion on the felled timber which can facilitate the clearing process.

The aforementioned problems are addressed by the brush rake of the present invention.

SUMMARY OF THE INVENTION

The present invention provides a brush rake attachment for use in cooperation with a tractor type vehicle, especially a skid steer-type loader, for clearing felled brush and timber from land. The attachment is used interchangeably in conjunction with a tree shearing attachment and includes a plurality of generally vertically aligned and arcuate tines mounted on a backing plate which is quickly and releasably securable to the tractor type vehicle. The curvature of the tines promotes a rolling motion facilitating the clearing process and a generally horizontal member provides stability to the tines.

The backing plate includes upper and lower flanges projecting downwardly and rearwardly. The flanges and backing plate engage and disengage an attachment mechanism on the tractor type vehicle. The attachment further includes a jack stand which positions the attachment for ease of connection with the tractor type vehicle.

OBJECTS OF THE INVENTION

The principal objects of the present invention are: to provide a brush rake attachment which can be quickly, releasably and simply secured to a tractor type vehicle; to provide such an attachment for use interchangeably in conjunction with a tree shearing attachment; to provide such an attachment which facilites brush clearing by promoting a rolling motion on the felled timber as it is pushed by the rake; to provide such an attachment which allows soil and selected trees to remain intact; to provide such an attachment which can be used to pile brush and timber in relatively high stacks generally free of dirt and soil; and to provide such an attachment which is relatively inexpensive to manufacture and particularly well adapted for the intended use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a brush rake shown in combination with a skid steer loader in accordance with the present invention.

FIG. 2 is a reduced scale perspective view of a tree shearing device in combination with the loader.

FIG. 3 is a right side elevational view of the rake and a fragmentary view of the loader, particularly showing the relationship thereof and showing a jack stand hingedly mounted on the rake in a supporting position in fixed lines and swinging to a storage position in phantom lines.

FIG. 4 is a side elevational view of the rake secured to the loader.

FIG. 5 is an enlarged and fragmentary right side elevational view of the loader and rake showing a loader tool attachment mechanism and a rake backing plate attached thereto.

FIG. 6 is an enlarged and fragmentary front elevational view of the rake.

FIG. 7 is an enlarged and fragmentary rear elevational view of the rake.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 10 generally represents a brush rake attachment. The rake 10 is for use in cooperation and combination with a tractor type vehicle, such as a skid steer loader 11, as shown in FIG. 1. The loader 11 is alternated in combination with a tree shearing device 12, as shown in FIG. 2. A suitable tree shearing device 12 for use with the present invention is available from Dymax, Inc. under the name of Dymax Hydraulic Tree Shear. The loader 11 includes a loader portion of an attachment mechanism 16 having a top engagement surface 17, a bottom engagement surface 18, and a front abutment surface 19. The tree shearing device 12 includes a hydraulic operating system operating in cooperation with a hydraulic system of loader 11.

The rake 10 comprises a plurality of generally vertically aligned and arcuate tines 22 arranged in a laterally spaced relationship, as shown in FIG. 6. The tines 22 are substantially parallel to each other and are securely mounted on a backing plate 23. Additionally at least one generally horizontal member 24 is mounted transversely to the tines 22 for stability. The tines 22, the backing plate 23 and the stabilizing member 24 define a tine framework 26 with a forwardly concave front curvature surface 30 and a rearwardly convex rear curvature surface 31. The tine framework 26 can be quickly secured and locked to or released from the loader 11 by cooperating the loader portion of the attachment mechanism 16 and a tool portion of the attachment mechanism on the backing plate 23, as shown in FIG. 5.

In general, the rake 10 is comprised of rigid and strong elements. More particularly, as shown in FIGS. 6 and 7, the rake 10 is reinforced in areas of potential fatigue or stress. A reinforcing tine member 33 is mounted on the right side outermost tine 22a and also on the left side outermost tine 22b. Each reinforcing tine member 33 is substantially similar in shape as the tines 22 and each extends from the top of the tine framework 26 to the bottom.

The tines 22 are spaced apart so as to allow rocks, stumps and other obstacles to pass between them, yet close enough together to collect timber, brush and the like. Obstacles such as stumps, however, are often of varying size and may be larger than the space between the tines 22. Consequently, reinforcing tooth members 34 may be mounted on either or both sides of the lower portion of the tines 22 to inhibit bending. In the present embodiment, the reinforcing tooth members 34 extend from near the top of the lower stabilizing member 24 to the bottom of the tine framework 26. Additional strength and reinforcement is provided by a reinforcing stabilizing member 35 extending between and securely mounted on the reinforcing tooth members 34 approximately 5 inches from the lower distal ends of the tines 22. It should be appreciated that the reinforcing members 33, 34 and 35 may be modified so as to maximize the strength of the brush rake 10.

The backing plate 23 engages and disengages with the loader portion of the attachment mechanism 16 and includes an upper flange 39 and a lower flange 40. The flanges 39 and 40 project downwardly and rearwardly from the backing plate 23 and each has an inboard surface 44 and 45 respectively. As shown in FIG. 5, when engaging the loader portion of the attachment mechanism 16, the inboard surfaces 44 and 45 abut the attachment mechanism top and bottom surfaces 17 and 18 respectively. The portion of the backing plate 23 between the flanges 39 and 40 abuts the attachment mechanism front surface 19 during engagement.

The attachment mechanism 16 further includes a manually operated locking lever 48 which selectively drives a pin member 49 up and down so as to disengage and engage, respectively, the backing plate 23. The pin member 49 is slidably received by a pin member receiving slot 52 in the lower flange 40. It should be appreciated that the attachment mechanism 16 could be modified, as in loaders different from the one illustrated, and corresponding modifications in the backing plate 23 would be necessary.

The rake 10 further comprises a jack stand 56 for maintaining the rake 10 in an upright position when not on the loader for ease of attachment. As shown in FIG. 3, the jack stand 56 includes at least one jack leg 57. The present embodiment jack stand 56 includes a pair of jack legs 57. Each jack leg 57 is hingedly mounted on the right and left sides of the tine framework 26 between two tines 22 so as to be pivoted upwards and clear from interfering with the brush clearing operation. Means for securing each jack leg 57, such as a chain 59, selectively maintains each jack leg 57 in an upright position. Each jack leg 57 has a proximate end 60 medially and pivotably attached to the rear curvature surface 31 of the tine framework 26 and a distal end 61. To each jack leg distal end 61 is attached a jack shoe 64. It should be appreciated that the jack shoe 64 can be modified so as to comprise a hingedly mounted pad, a gauge wheel, or the like.

When the jack stand 56 is in a lowered position thereof, as shown in FIG. 3, a support member 68 maintains the position of each jack leg 57 relative to the ground and the tine framework 26. With the jack stand 56 in a lowered or supporting position thereof, the attachment mechanism 16 may be manipulated using the hydraulic system of the loader 11 to advance the attachment mechanism top and bottom surfaces 17 and 18 into or out of abutting relationship with the inboard surfaces 44 and 45 of the upper and lower flanges 39 and 40 respectively. When the attachment mechanism top and bottom surfaces 17 and 18 are positioned in abutting relationship with the inboard surfaces 44 and 45 of the upper and lower flanges 39 and 40 respectively, the locking lever 48 may be operated to lock the rake in secured relationship to the loader 11. Likewise, the support member 68 is detached from the jack leg 57 when the jack leg 57 is pivoted upwards. As shown in FIG. 4, the jack legs 57 are secured to the rear curvature 31 of the tine framework 26 when the jack stand 56 is in a raised position subsequent to attaching the rake 10 to the loader 11 by a chain, pin or the like.

It is to be understood that while certain forms of the present invention have been illustrated and described herein, it is not to be limited to the specific forms or arrangement of parts described and shown.

What is claimed and desired to be secured by Letters Patent is as follows:

1. A brush rake attachment for use in cooperation with a tractor type vehicle having an attachment mechanism, said brush rake attachment comprising:
   (a) a plurality of arcuate tines attached together in laterally spaced relationship to form a forwardly concave tine framework; said tines being generally vertically aligned during use;
   (b) a jack stand for supporting said brush rake attachment in an upright position when said brush rake attachment is freestanding; such that said brush rake attachment is held in an upright position when freestanding and is adapted to be easily and quickly secured to the tractor type vehicle by the manipulation of the attachment mechanism of the tractor type vehicle; and (c) attachment means adapted to selectively cooperate with the attachment mechanism of the tractor type vehicle for quickly and releasably securing and locking said brush rake attachment to the attachment mechanism of the tractor type vehicle.

2. The brush rake attachment as described in claim 1 in combination with said tractor type vehicle wherein:

(a) said attachment mechanism includes a locking lever; said locking lever cooperating with receiving means on said brush rake attachment for quickly and releasably securing said brush rake attachment to said attachment mechanism.

3. The brush rake attachment as described in claim 1 wherein said jack stand comprises:

(a) at least one jack leg hingedly connected to said tine framework; said jack leg being selectively advanceable from a supporting position, wherein said jack leg supports said tine framework in said upright position, to a storage position.

4. The brush rake attachment as described in claim 1 wherein:

(a) said tine framework includes at least one generally horizontal stabilizing member.

5. The brush rake attachment as disclosed in claim 1 in combination with:

(a) said tractor type vehicle.

6. The brush rake attachment and tractor type vehicle as disclosed in claim 5 in combination with:

(a) a tree shearing device interchangeably usable with said rake on said vehicle attachment mechanism.

7. A brush rake attachment in cooperation with a skid steer loader with an attachment mechanism having top, bottom and front surfaces, comprising:

(a) a backing plate including an upper flange and a lower flange projecting rearwardly from said backing plate;

(b) a plurality of arcuate tines arranged in laterally spaced relationship having a generally vertical and upright alignment during use; said tines cooperating with at least one horizontal stabilizing member and said backing plate to form a forwardly concave tine framework that is relatively much taller than wide when viewed from the side so as to be unstable when freestanding;

(c) a jack stand comprising at least one jack leg with proximate and distal ends; said proximate end of each of said jack legs pivotally mounted on said tine framework such that said jack leg is hingedly advanceable from a supporting position, wherein said framework is freestanding and said jackstand supports said framework in the upright alignment thereof, to a storage position when said brush rake attachment is connected to said skid steer loader and such that, when said brush rake is support by said jackstand, said top and bottom surfaces of said attachment mechanism of said skid steer loader are adapted to be advanced out of and into abutting relationship with said upper and lower flanges respectively of said backing plate on said brush rake attachment by the manipulation of said attachment mechanism;

(d) attachment means selectively cooperating with said attachment mechanism of said skid steer loader for quickly and releasably securing and locking said brush rake attachment to said attachment mechanism of said skid steer loader positioned in abutting relationship thereto.

8. The brush rake attachment in cooperation with a skid steer loader as disclosed in claim 7 further comprising:

(a) a support member hingedly secured to each of said jack legs and selectively and releasably positionable so as to maintain said respective jack leg in said supporting position with respect to said brush rake attachment.

9. The brush rake attachment in cooperation with a skid steer loader as disclosed in claim 7 further comprising:

(a) securement means for securing each of said jack legs in said storage position.

10. The brush rake attachment as described in claim 7 wherein:

(a) said attachment mechanism includes a locking lever; said locking lever cooperating with receiving means on said lower flange of said backing plate of said brush rake attachment for quickly and releasably securing said brush rake attachment to said attachment mechanism.

* * * * *